(12) United States Patent
Dharanikota

(10) Patent No.: US 6,914,883 B2
(45) Date of Patent: Jul. 5, 2005

(54) QOS MONITORING SYSTEM AND METHOD FOR A HIGH-SPEED DIFFSERV-CAPABLE NETWORK ELEMENT

(75) Inventor: Sudheer Dharanikota, Pleasanton, CA (US)

(73) Assignee: Alcatel, Paris (FR)

( * ) Notice: Subject to any disclaimer, the term of this patent is extended or adjusted under 35 U.S.C. 154(b) by 836 days.

(21) Appl. No.: 09/750,601

(22) Filed: Dec. 28, 2000

(65) Prior Publication Data

US 2002/0107908 A1 Aug. 8, 2002

(51) Int. Cl.[7] .......................... H04L 1/00; H04L 12/28; H04L 12/56
(52) U.S. Cl. ..................... 370/230.1; 370/235; 370/389
(58) Field of Search ............................... 709/230, 232, 709/235; 370/229–238, 389

(56) References Cited

U.S. PATENT DOCUMENTS

| | | | | |
|---|---|---|---|---|
| 6,092,113 | A | * | 7/2000 | Maeshima et al. .......... 709/230 |
| 6,381,214 | B1 | * | 4/2002 | Prasad ..................... 370/230.1 |
| 6,574,195 | B2 | * | 6/2003 | Roberts ....................... 370/235 |
| 6,608,816 | B1 | * | 8/2003 | Nichols ....................... 370/235 |
| 6,611,522 | B1 | * | 8/2003 | Zheng et al. .......... 370/395.21 |
| 6,657,962 | B1 | * | 12/2003 | Barri et al. .................. 370/235 |
| 6,741,597 | B1 | * | 5/2004 | Jeong .................... 370/395.21 |
| 2002/0129158 | A1 | * | 9/2002 | Zhang et al. ............... 709/234 |

OTHER PUBLICATIONS

Crawley, Argon Networks/Nair, Arrowpoint/Rajagopalan, NEC USA/Sandick, Bay Networks; "A Framework for QoS–based Routing in the Internet"; 33 pages; Aug. 1998. [www.ietf.org/rfc/rfc2386].

Nortel Northern Telecom/Bay Networks; "IP QoS—A Bold New Network"; 24 pages; Sep. 1998.

Heinanen, Telia Finland/Guerin, Univ. of PA; "A Two Rate Three Color Marker"; 5 pages; Sep. 1999. [www.ietf.org/rfc/rfc2698].

Heinanen, Telia Finland/Guerin, Univ. of PA; "A Single Rate Three Color Marker"; 6 pages; Sep. 1999. [www.ietf.org/rfc/rfc2697].

Jain/OSU; "QoS/Policy/Constraint Based Routing"; 26 pages; Last Modified Dec. 1, 1999. [www.cis.ohio-state.edu/~jain/cis788-99/qos_routing/index].

* cited by examiner

*Primary Examiner*—Seema S. Rao
*Assistant Examiner*—Robert C. Scheibel, Jr.
(74) *Attorney, Agent, or Firm*—Danamraj & Youst, P.C.; Bobby D. Slaton; V. Lawrence Sewell

(57) ABSTRACT

A QoS monitoring system and method for a DiffServ-capable network element operable in a trusted domain network such as an ISP network. The network element is organized as a plurality of terminating line cards interconnected via a switch fabric capable of supporting virtual ingress/egress pipes (VIEPs). Buffer queues on the ingress and egress sides of the network element, which are established for supporting traffic flows on individual VIEPs, are monitored for determining QoS parametric information such as throughput, loss, delay, jitter and available bandwidth. A policing structure is operably coupled with a buffer acceptance and flow control module for monitoring traffic behavior on the ingress side. Another buffer acceptance/flow control module and aggregate-level monitoring module are disposed on the egress side of the network element that cooperates with a scheduler which shapes outgoing traffic. The monitoring for the PIPE traffic reflects the conformance of the service provider to their customers, whereas the monitoring for the HOSE traffic reflects the level of over- or under-provisioning for a given COS. Feedback flow control is provided between the ingress and egress sides for throttling buffer acceptance.

4 Claims, 10 Drawing Sheets

QOS MONITORING SYSTEM AND METHOD FOR A HIGH-SPEED DIFFSERV-CAPABLE NETWORK ELEMENT

BACKGROUND OF THE INVENTION

1. Technical Field of the Invention

The present invention relates generally to Quality of Service (QoS) provisioning in communications networks. More particularly, without limitation, the present invention relates to a QoS monitoring system and method for a high-speed DiffServ-capable network element (e.g., a router) disposed in an autonomous system.

2. Description of Related Art

Driven by the myriad advances in networking technology that are taking place at an unprecedented rate, Internet access solutions and Internet-based applications such as e-commerce have become the mainstay of today's New Economy. Internet service providers (ISPs) and Internet access providers (IAPs), which provide access to the Internet and range in size from small, local operators to national entities offering connectivity and IP-based services nationwide or internationally in some instances, are now as ubiquitous as local hardware stores and compete vigorously for subscribers by offering a variety of pricing plans and variable bandwidth services. Further, an increasing number of prominent national ISPs have begun to offer proprietary services and content in addition to simple Internet access.

Despite the Internet's rapid growth over the last ten years or so, several important considerations remain. For example, because the Internet is a connectionless and stateless network, current Internet-based service implementations can only provide "best-effort" services. That is, whereas the network will try its best to forward user traffic, it cannot provide any guarantees regarding packet loss rate, bandwidth, delay, etc. Thus, packets may be dropped indiscriminately in the event of congestion, path failures, and the like. While this kind of service works fine for some traditional applications (e.g., file transfer protocol or FTP, email, etc.), it is intolerable for the newly emerged real time, multimedia applications such as Internet Telephony, video-conferencing, video-on-demand, Interactive TV (ITV), online music, etc.

Accordingly, it is commonly understood in the communications industry that the cornerstone of future IP network growth will be IP QoS, which provides for a set of service requirements to be met by the IP network while transporting a flow (typically defined as a packet stream from a source to a destination (unicast or multicast)). In other words, QoS is defined as a measurable level of service delivered to network users, which can be characterized by a set of metrics (e.g., packet loss probability, delay, jitter or delay variation, available bandwidth, et cetera). Such QoS can be provisioned by network service providers in terms of a service agreement (e.g., a Service Level Agreement or SLA) between subscribers and providers. For example, a subscriber's requirement can be that for some traffic flows generated by the subscriber, the network should guarantee a path with at least certain bandwidth level.

It should be apparent that by employing different levels of IP QoS, service providers can achieve greater profitability through premium services offered to high-margin business customers, more efficient use of network resources, and higher-priced service levels. In addition, they can be more competitive through enhanced service differentiation, better-than-best-effort service, and customized solutions.

To make a contractual agreement that customers can trust, a service provider needs a network with QoS capabilities and a policy management system to configure, control, and maintain performance levels. Differentiated Services (DiffServ) is an IP QoS architecture defined by the Internet Engineering Task Force (IETF) that has particular reference to the service provider and carrier networks. DiffServ concentrates on aggregating flows and per hop behavior applied to a network-wide set of traffic classes, thereby minimizing the amount of signaling required. Effectively, DiffServ provides a lightweight signaling mechanism between service provider's domain borders and network nodes, carrying information about each packet's service requirements.

Whereas the DiffServ framework provides broad architectural guidelines with respect to the provisioning of IP QoS in a trusted domain, management of traffic flows within an individual DiffServ-capable node is contemplated to be application- and implementation-specific. As a result, there exists a need for solutions that reliably and accurately monitor the traffic behavior within a node and help determine QoS relevant parametric information in order to ensure appropriate levels of service within the DiffServ framework.

Current techniques for monitoring intra-nodal traffic behavior for DiffServ purposes are beset with various shortcomings and deficiencies, however. For example, the existing QoS monitoring schemes typically involve processes with a high granularity of measurements. Thus, the aggregate level traffic behavior (e.g., per port, per class, etc.) is not adequately captured. In addition, where the traffic is segregated into different queues according to some classification, dynamic behavior of such queues is not monitored against service-constraint-based thresholds that may be required for SLA assurance, compliance and analysis. As a consequence, the current solutions cannot provide a reliable measurement of average occupancy of the DiffServ-provisioned queues. Furthermore, parameters that quantify resource-specific behavior such as average under- and over-utilization of the resources (e.g., bandwidth, buffer depth, etc.) are not adequately profiled as well.

SUMMARY OF THE INVENTION

Accordingly, the present invention provides a QoS monitoring system and method for a DiffServ-capable network element operable in a trusted domain network (such as an ISP/IAP network) that advantageously overcomes these and other shortcomings of the state-of-the solutions. Preferably, the trusted domain network is operable as an autonomous system wherein QoS parametric information may be monitored on multiple aggregate levels for SLA analysis, compliance and enforcement.

In one aspect, the present invention is directed to a network element (e.g., an edge router, core router, or transit router, collectively, a routing element) that is organized as a plurality of terminating line cards or TLKs interconnected via a switch fabric capable of supporting virtual ingress/egress pipes (VIEPs) between transmitter cards (ingress cards) and receiver cards (egress cards). Each TLK card is operable to support one or more incoming or outgoing communication links with respect to the network element, depending on its configuration. At least a portion of the TLK cards are operable as the network element's ingress side. Similarly, a portion of the TLK cards are operable as the egress side of the network element. Buffer queues on the ingress and egress sides of the network element, which are established for supporting traffic flows on individual VIEPs, are monitored for determining QoS parametric information such as throughput, loss, delay, jitter and available bandwidth. A policing structure is associated with the ingress cards for monitoring and measuring incoming traffic on the incoming communications links against an expected traffic profile or behavior pattern associated with the incoming traffic. A buffer acceptance and flow control module is associated with each of the ingress and egress cards that operates to manage the traffic flows associated with the VIEPs through the switch fabric. Preferably, the traffic flows are operable to be effectuated with resource reservations allocated in the switch fabric depending on type of service (e.g., real time vs. non-real time), Class of Service, SLA-based traffic engineering (TE) policies/priorities, et cetera. A traffic shaping and scheduling module is operable with an aggregate-level monitoring module disposed on the egress cards for scheduling and shaping outgoing traffic on the outgoing communications links to the network element's neighboring nodes in the network. Feedback flow control is provided between the ingress and egress sides for throttling buffer acceptance and packet discarding based on buffer congestion thresholds established on the egress side.

In another aspect, the present invention in directed to a method for processing QoS parametric information in a network element operable in an IP network, wherein the network element includes at least one terminating line card operable as an ingress card supporting an incoming communication link, at least one terminating line card operable as an egress card supporting an outgoing communications link and a switch fabric disposed between the ingress and egress cards for supporting a plurality of VIEPs therebetween. Upon receiving incoming information packets on the incoming link of the network element, a determination is made in an ingress portion a network processor system disposed on the ingress card whether the incoming information packets pertain to an IP-based service. Responsive to the determining step, the incoming information packets are forwarded to an egress portion of the network processor system via the switch fabric. The packets are monitored for conformance with respect to the reserved VIEP resources to the destination TLK (i.e., egress card). The processed information packets are transmitted to the egress card via a select VIEP for routing the processed information on a target outgoing link to a neighbor in the network The egress portion preferably includes an embedded processor operable to perform a plurality of IP-based QoS (IPQoS) monitoring operations and for processing the incoming information into processed information.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
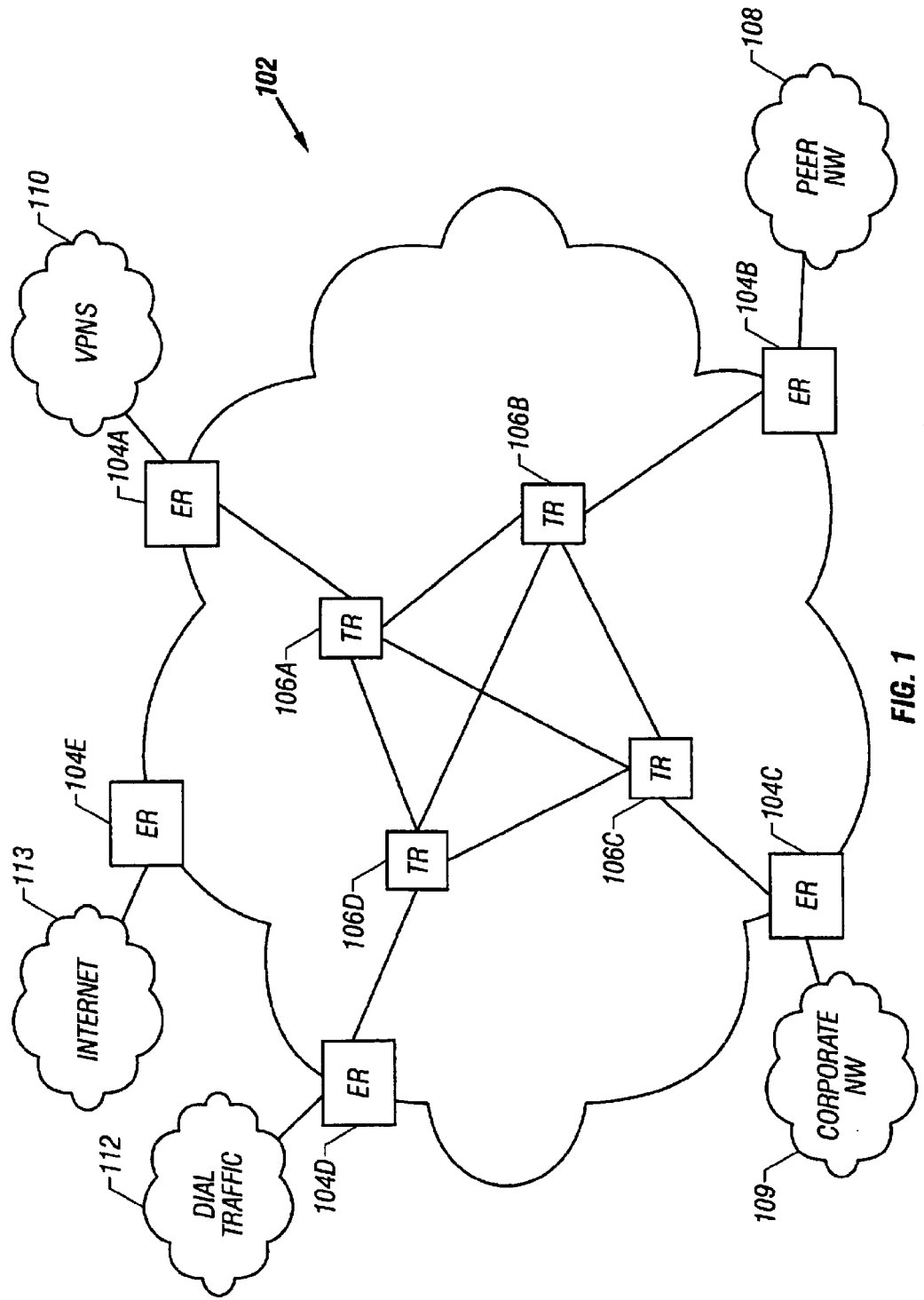
FIG. 1 depicts an exemplary autonomous system operating as a trusted domain for coupling with a plurality of networks, wherein network elements incorporating the teachings of the present invention are advantageously employed.

In the drawings, like or similar elements are designated with identical reference numerals throughout the several views thereof, and the various elements depicted are not necessarily drawn to scale. Referring now to FIG. 1, depicted therein is an exemplary autonomous system (AS) network 102 operating as a trusted domain for coupling with a plurality of networks, wherein a plurality of network elements incorporating the teachings of the present invention are advantageously employed. It should be appreciated by those skilled in the art that the AS network 102 is preferably provided as a routing domain which has a common administrative authority and consistent internal routing policy. In an exemplary embodiment, the AS network 102 may employ multiple intradomain routing protocols internally (e.g., Open Shortest Path First (OSPF), Routing Information Protocol (RIP), etc.) and interface to other ASs via a common interdomain routing protocol (e.g., Border Gateway Protocol or BGP).

In addition, the AS network 102 may be provided in an exemplary functional embodiment as an ISP/IAP network operated by a network service/access operator for providing various IP-based services, including access, in accordance with any established or heretofore unknown Differentiated Services (DiffServ) scheme that supports IP-based QoS (IPQoS). As an ISP network, accordingly, the AS network 102 is operable to serve its subscribers via a plurality of networks, e.g., virtual private networks (VPNs) 110, peer networks 108 (e.g., other ISP networks), enterprise or corporate networks 109 (e.g., intranets), and circuit-switched networks or packet-switched networks for dial traffic, e.g., network 112. Further, a public IP network such as the Internet 113 is also coupled to the AS network 102 for facilitating Internet-based services involving data, voice, multimedia, and video.

A plurality of DiffServ-capable network elements or nodes (e.g., edge routers 104A–104E and transit routers 106A–106D) form the trusted domain of the AS network 102, which is capable of instituting a range of SLAs with one or more of its subscribers including dial-up, corporate, wholesale, or peer network customers. These SLAs may be simple standard service contracts for mass consumers or customized and multidimensional service agreements for business and corporate customers. An SLA, which defines end-to-end service specifications, may comprise any of the following components in the context of the present invention: (i) service availability; (ii) service levels offered; (iii) service guarantees; (iv) responsibilities; (v) service auditing; and (vi) pricing arrangements.

A plurality of QoS metrics or measurements are preferably used for quantifying the service requirements of a particular SLA. Well known QoS metrics include bandwidth (BW), throughput, delay, jitter (i.e., delay variation), cost, loss probability or packet loss rate, et cetera. These QoS metrics may be categorized into three types: additive, multiplicative, and concave. Let $m(n1,n2)$ be a metric for link$(n1,n2)$. For any path $P=(n1, n2, \ldots ni, nj)$, where $n1, n2, \ldots, nj$ represent network nodes, metric m is additive if $m(P)=m(n1,n2)+m(n2,n3)+ \ldots +m(ni,nj)$. Examples are delay, jitter, cost, and hop-count. For instance, the delay of a path is the sum of delay of every hop. Metric m is multiplicative if $m(P)=m(n1,n2)*m(n2,n3)* \ldots *m(ni,nj)$. An example of a multiplicative metric is reliability, in which case $0<m(P)<1$. Metric m is concave if $m(P)=\min\{m(n1,n2), m(n2,n3), \ldots, m(ni,nj)\}$. Available bandwidth is an example of a concave metric, where the bandwidth of a path is determined by the link hop with the minimum available bandwidth.

As will be described in greater detail hereinbelow, QoS metric monitoring may be effectuated at one or more DiffServ-capable network elements of the AS network 102 for any of the following Classes of Service (COS) as may be applicable: Constant Bit Rate (CBR); Real Time Variable Bit Rate (VBR-RT); Non-Real Time Variable Bit Rate (VBR-NRT); Available Bit Rate (ABR); and Unspecified Bit Rate (UBR).

Figure 2:
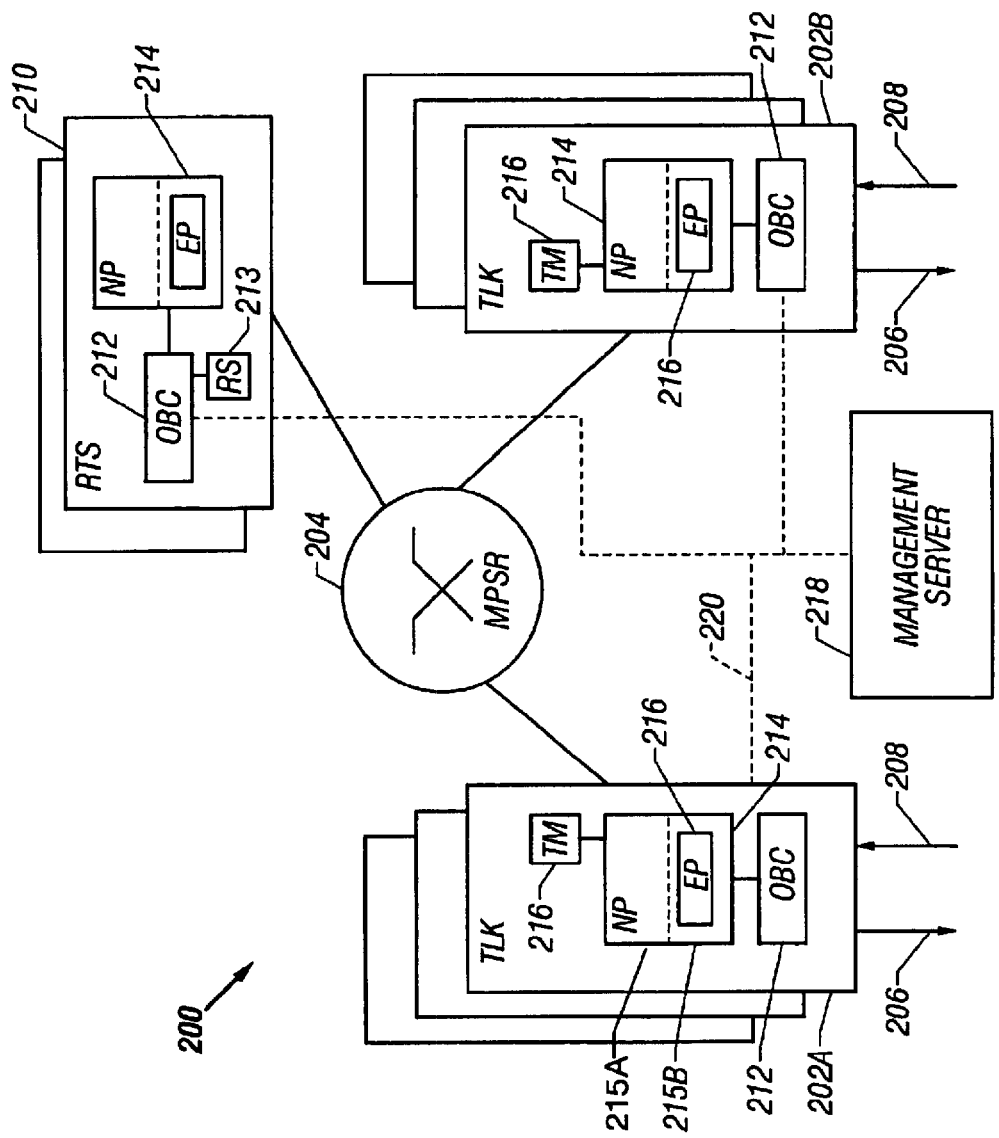
FIG. 2 depicts a functional block diagram of an exemplary network element provided in accordance with the teachings of the present invention for operating in an trusted domain.

FIG. 2 depicts a functional block diagram of an exemplary network element 200 provided in accordance with the teachings of the present invention for operating in a trusted domain such as the AS network 102 described hereinabove. The network element 200 is preferably comprised of a plurality of termination line cards (TLKs), e.g., TLK 202A and TLK 202B, and a plurality of real time server (RTS) boards 210, wherein the TLK cards and RTS boards are interconnected through a switching fabric 204. In the presently preferred exemplary embodiment of the present invention, the switching fabric 204 is provided as a Multi-Path Self Routing (MPSR) switch that is capable of supporting a plurality of virtual ingress/egress pipes (VIEPs) used for transporting traffic flows through the network element.

In addition to the internal communication pathways established through the MPSR switch fabric 204 (which is preferably used for all IP load and control traffic), the TLK cards and RTS boards are operable to communicate via an overlay network 220 used for administrative functions such as software downloading, initialization, and management and maintenance configuration. A management server (MS) 218 is accordingly provided as part of the network element 200 for coordinating and hosting these administrative functions.

The functionality of TLK cards includes termination of external communication links, IP/MPLS forwarding, termination of link-related protocols (e.g., PPP, Label Distribution Protocol or LDP, Resource Reservation Protocol or RSVP, etc.) and switch interface functions such as Segmentation and Reassembly (SAR), resequencing, etc. The RTS boards complement forwarding capabilities of the TLK cards by providing the capability to process routing protocol messages. Routing protocols such as BGP, OSPF, etc., are typically processed on a route server (RS) 213 on the RTS boards. Consequently, forwarding tables are calculated and distributed through the MPSR switch fabric 204 by the route server to all forwarding engines on the TLK cards of the network element. In addition, the RTS boards are used for relaying external management messages from any external interface to MS 218. Further, an interface (e.g., Gigabit Ethernet (GENET) interface) (not explicitly shown in FIG. 2) to an external "charging server" may be included in the RTS boards for effectuating pricing policies of an SLA.

The functionality of the TLKs and RTSs is primarily carried out by one or more network processor (NP) modules (e.g., reference numeral 214) in conjunction with an on-board controller (OBC) processor 212. Each NP module is preferably comprised of an ingress portion 215A and an egress portion 215B. As will be seen in greater detail hereinbelow, an embedded processor (EP) 216 provided in the egress portion 215B is primarily responsible for the processing of incoming packets having IP service options (including IPQoS monitoring requirements). Moreover, EP 216 is also operable to process signaling protocol packets (origination or destination) for both L2 and L3 layers (e.g., PPP and GENET at L2 and RSVP and LDP at L3).

In addition to interfacing with the overlay communication network 220, OBC processor 212 is responsible for MPSR interface control. The switch generic interface functionality of the TLK/RTS card is comprised of a traffic manager (TM), which may be provided as a separate TM module 216 or as an embedded functionality of OBC processor 212, and a switch component. TM functionality is primarily responsible for effectuating the interface between the MPSR switch and the TLK/RTS card at all levels: physical level, logical-protocol level, and BW management level.

QoS-aware or QoS monitoring software applications running on EP 216 and OBC 212 are operable to intercommunicate via a TCP/IP protocol stack of resident operating systems (OS). For example, information regarding BW allocation for VIEPs in the switch is preferably communicated from an RSVP application (which is an EP process) to OBC in order to properly configure a TLK's TM. Further, the software environment of both processors preferably includes appropriate drivers (e.g., Peripheral Component Interconnect (PCI) drivers, etc.) for additional functionality.

Figure 3:
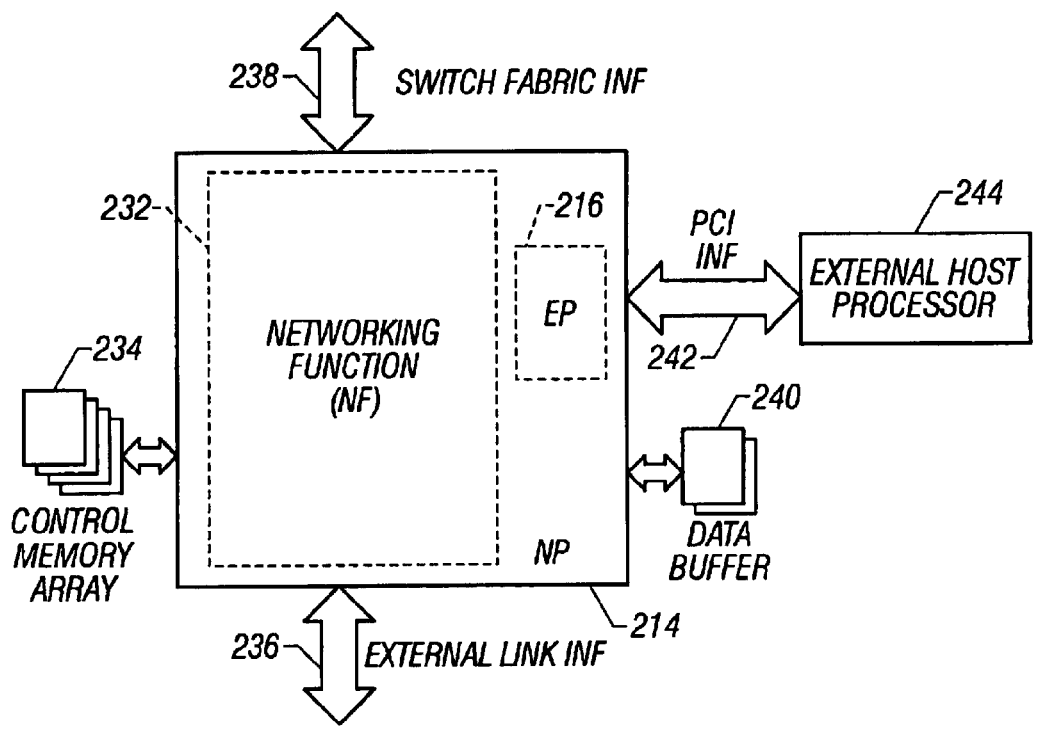
FIG. 3 depicts a functional block diagram of a network processor subsystem used in a terminating line card (TLK) of the exemplary network element of the present invention.

Referring now to FIG. 3, depicted therein is a functional block diagram of the network processor subsystem 214 in additional detail. A networking function (NF) 232 is responsible for packet processing functionalities such as, e.g., forwarding, filtering, scheduling, etc. In addition to processing information packets with IP options, EP 216 is also operable to perform control functions such as IP control protocol message processing, exception processing, table management, and executing link-related signaling protocols. Several functional interfaces are associated with the NP subsystem 214 for facilitating its networking and QoS-aware functionalities. An external link interface 236 is provided for supporting incoming or outgoing links (e.g., links 206 and 208 depicted in FIG. 1) with respect to the network element. When configured as a receiver for packet information emanating from transmitting neighbors, the TLK having the NP module 214 is operable as an ingress card disposed on the ingress side of the network element. In similar fashion, a TLK having the NP module 214 may be configured as an egress card disposed on the egress side of the network element when packet information is transmitted via the external link interface 236 to the neighboring receiver elements. The external link interface 236 is therefore operable to receive/transmit packets towards the PHY layer devices that can be configured to support Layer 2 protocols, e.g., Fast Ethernet (FENET), GENET, etc., with appropriate media access control (MAC).

A switch interface 238 is provided for transmitting to or receiving from the switch fabric various intra-node traffic flows that are managed for QoS assurance. In some exemplary embodiments, a redundant switch interface may also be provided for increased reliability. A control memory array 234 is interfaced with the NP module 214 for storing control information, e.g., forwarding information base or bases (FIB), QoS monitoring counters, etc. Preferably, the control memory array 234 may be comprised of both SRAM and DRAM.

Continuing to refer to FIG. 3, a data buffer memory 240 is interfaced to the NP module 214 for storing information packets at the egress before they are transmitted on the external link or towards the switch fabric. Preferably, the data buffer memory 240 is implemented with double data rate (DDR) DRAM modules. A PCI interface 242 is provided for connecting an external host processor 244 such as, e.g., OBC processor 212 depicted in FIG. 2. Those skilled in the art should recognize that this interface is primarily used for system initialization and interaction of the NP module 214 with board and system management functions.

Figure 4:
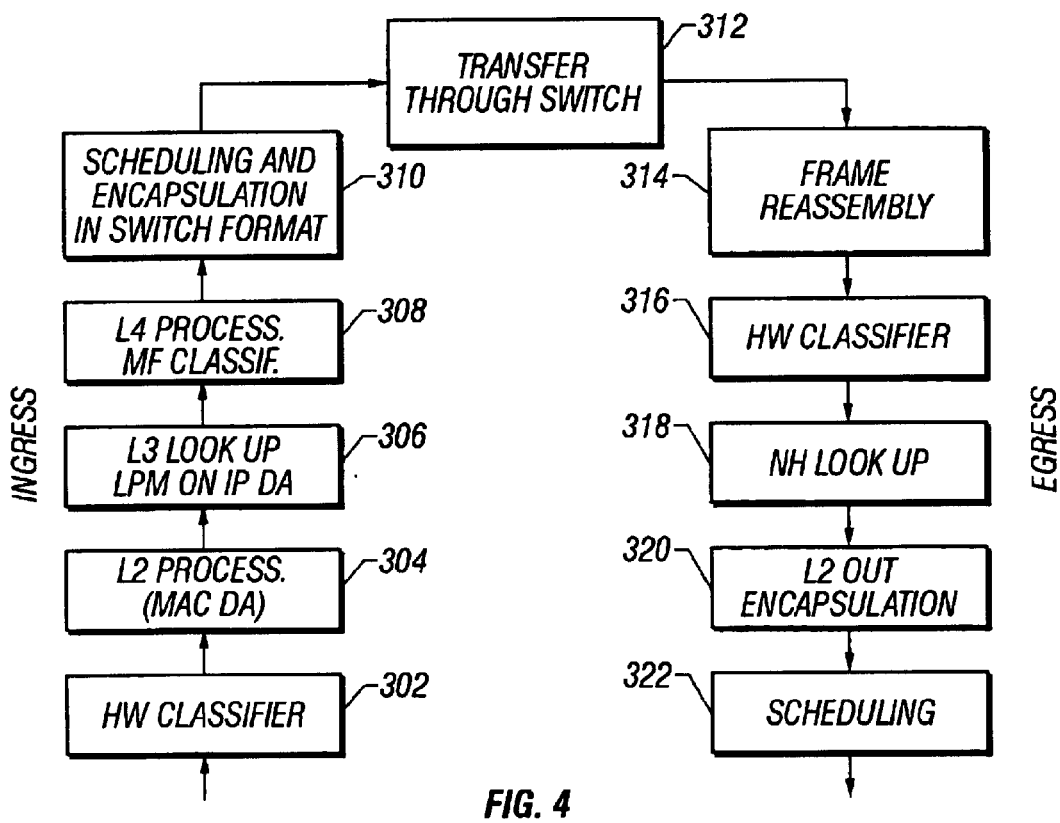
FIG. 4 depicts a functional block diagram of packet flow in the exemplary network element.

FIG. 4 depicts a functional block diagram of IP packet flow in the exemplary network element of the present invention. On the ingress side, the header of received frames is first parsed by a hardware (HW) classifier 302. This process classifies the packet depending on code entry point (e.g., PPP vs. GENET frame) and protocol number in L2 header into different protocol types (e.g., IP over PPP, MPLS over PPP, PPP control packet flow, et cetera). In addition, the HW classifier 302 detects a plurality of predesignated fields in the IP header (e.g., color of DiffServ class (described in greater detail below), TCP/UDP/TCP_SYN flag, IP service flags, etc.). The results of this classification process are passed to appropriate software (SW) modules at the dispatch time as Code Instruction Address or Addresses (CIA) and a Flow Control Block (FCB) page.

After dispatching the frames to the SW modules, they are analyzed in three stages: L2, L3 and L4 processing (reference numerals 304, 306 and 308, respectively). L2 processing is based on the MAC destination address (DA) and involves parsing the protocol number in L2 header (IP, Address Resolution Protocol (ARP), PPP control messages, etc.). If the frame is a PPP control message, it is re-directed to the EP of the NP module (shown in FIG. 2). Where IP packets are involved, they are passed to L3 processing 306, together with an indication as to where IP header starts.

L3 processing 306 involves performing Longest Prefix Match (LPM) search on IP DA. In a presently preferred exemplary embodiment of the present invention, various checks are also performed on the IP header: IPv4, checksum, etc. In addition, several operations relating to DiffServ (policing, buffer acceptance and control, BW classification, et cetera, which will be set forth in greater detail hereinbelow) are performed at this stage as well. Three possible outcomes can be generated due to L3 processing: (i) forward IP packets to L4 processing; (ii) redirect the frames to another module (e.g., IP with service options is redirected to the EP of the NP module); or (iii) drop the frame.

L4 processing 308 involves Multi-Field (MF) classification, wherein a searching key is constructed based on multiple fields of IP and TCP headers and a software managed tree (SMT) search is then performed. Once the processing is completed and the contents of the FCB page fields are filled in, the frame is enqueued in the ingress scheduler for scheduling towards the switch fabric (reference numeral 310). At the transmission time (after the frame has been scheduled), appropriate HW constructs a Frame Header (FH) and Cell Header (CH) based on the FCB fields, and the data is read from the ingress buffer and sent to the switch fabric in the form of cells having a predesignated format (reference numeral 312).

At the egress side, a frame reassembly process 314 is effectuated first. The reassembled frame is dispatched for HW classification (reference numeral 316) where the HW classifier parses the FH and sets appropriate code entry points depending on the frame format. Subsequently, a Next Hop (NH) processing block 318 performs a search on the NH IP address in the ARP table. The result of the search returns L2 encapsulation (reference numeral 320) to be used. Other checks such as fragmentation detection (depending on Maximum Transmission Unit (MTU) size, frame alteration commands (e.g., new IP checksum), etc., may also be performed at this time. Thereafter, L2 encapsulation corresponding to a target port is added to the IP packet and the frame is enqueued in a flow queue of the egress scheduler (reference numeral 322). At the time the frame is eligible for transmission, it is read from the egress data buffer and transmitted on an external link interface.

To support DiffServ (DS) capabilities, a Type of Service (ToS) field available in IPv4 implementation is marked on the ingress side in order to effectuate various levels of service priorities. The eight-bit ToS field is treated as a DS field where priorities such as DE (Default—indicating a best-effort CoS); EF (Expedited Forwarding; AF (Assured Forwarding), etc., are mapped. To support the various DS levels, cell traffic in the VIEPs is also mapped with appropriate levels. Priority 00 and priority 01 cells are mapped into high priority queues (real time (RT) traffic). As a consequence, during port configuration, adequate BW reservation needs to be set up for the appropriate VIEP in order to prevent higher loss of RT traffic in that VIEP. On the other hand, low priority cells (i.e., Priority 10) are mapped to non-real time (NRT) queues. As pointed out earlier, ensuring premium services requires a QoS metrics monitoring system and method relevant to the traffic flow within the network element, which will be set forth in greater detail hereinbelow.

Figure 5:
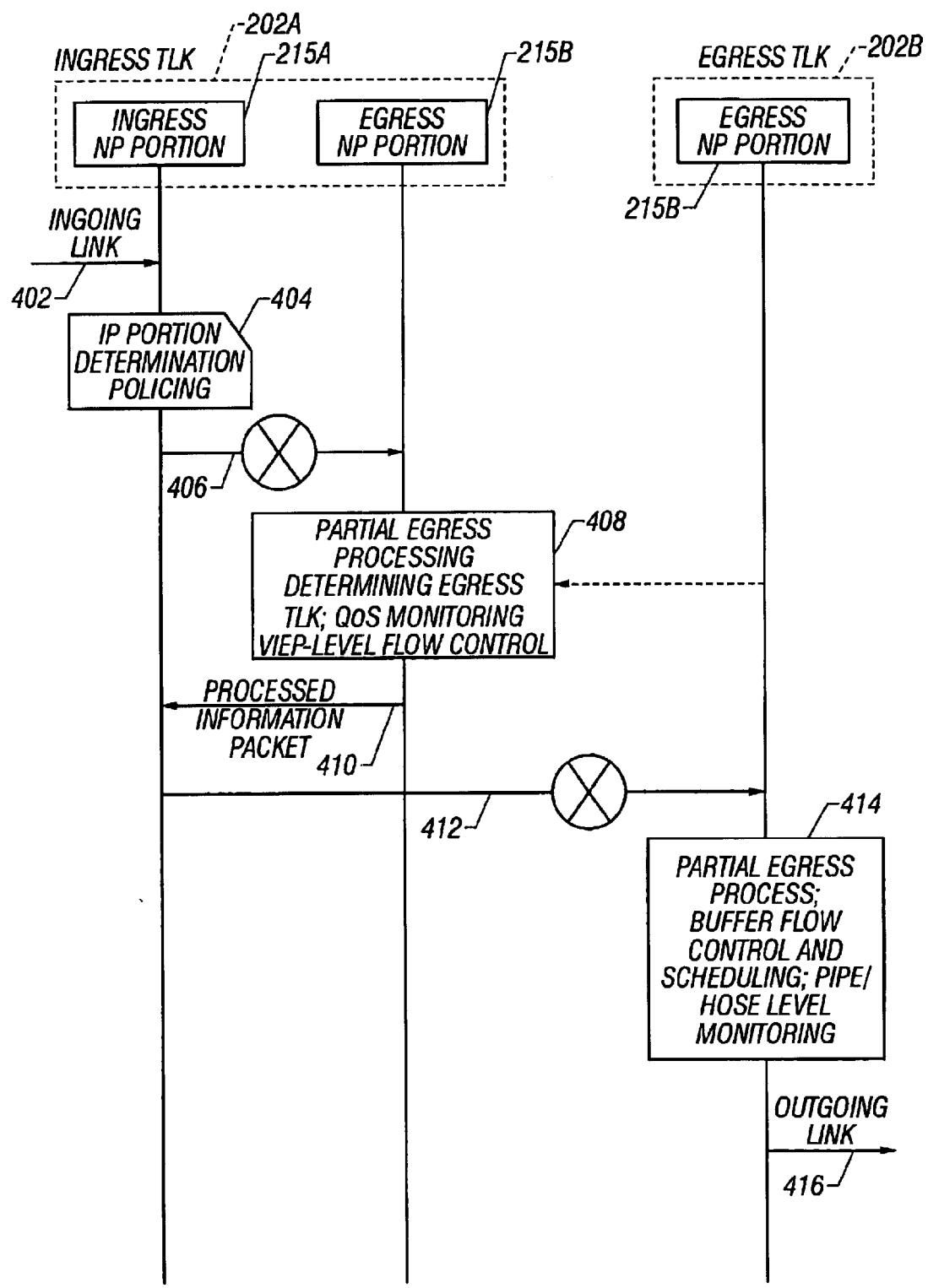
FIG. 5 is a message flow diagram for effectuating IP QoS monitoring in the exemplary network element in accordance with the teachings of the present invention.

FIG. 5 is a message flow diagram for effectuating IP QoS monitoring in the exemplary network element in accordance with the teachings of the present invention. TLK 202A and TLK 202B are exemplified as the ingress and egress sides of the network element. Upon receiving information packets on an incoming link 402, determination is made (reference numeral 404) in the ingress NP portion 215A of the ingress TLK 202A whether IP service options are involved. Also, the incoming traffic is policed for in-profile or out-of-profile determinations. If the packets involve IP options, they are redirected (reference numeral 406) to the egress NP portion 215B via the switch fabric, where the EP appropriately processes the packets for egress scheduling (including determining outgoing interface and target port information) (reference numeral 408). Also, various QoS-aware and QoS-specific monitoring applications relating to buffer acceptance and VIEP-level flow control are performed. The processed information is then passed back (reference numeral 410) to the ingress portion of the ingress TLK 202A, whereupon it is transmitted (reference numeral 412) to the egress NP portion 215B of the egress TLK 202B through the switch fabric. Appropriate buffer control takes place on the egress side also (reference numeral 414), which may preferably involve sending feedback control signals to the ingress TLK for throttling its buffer control mechanism. In addition to partial egress processing, PIPE/HOSE-level monitoring (described hereinbelow in additional detail) also takes place at this juncture. Thereafter, the outgoing traffic is shaped and scheduled for transmission (reference numeral 416) on an outgoing link.

Figure 6:
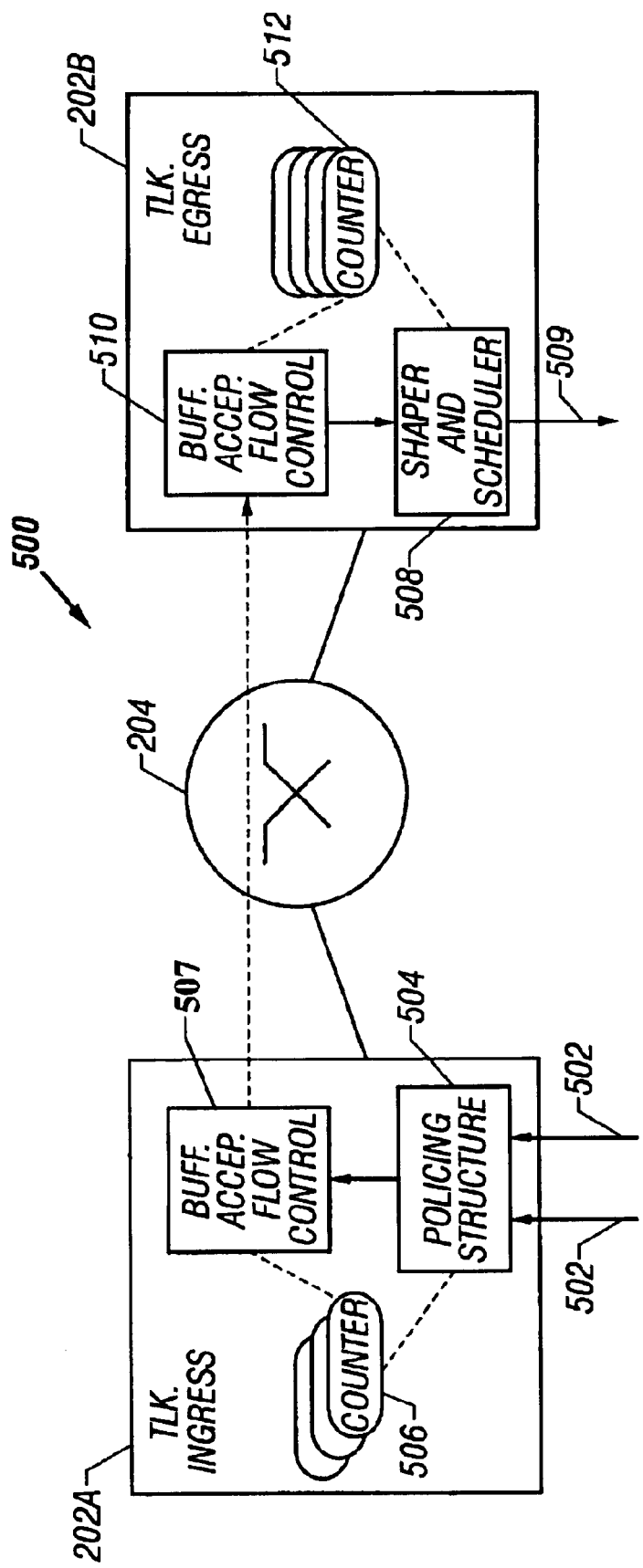
FIG. 6 depicts a functional block diagram of a QoS monitoring system for use in the exemplary network element in accordance with the teachings of the present invention.

FIG. 6 depicts a functional block diagram of a QoS monitoring system 500 for use in the exemplary network element in accordance with the teachings of the present invention. For purposes of ensuring DiffServ capability and corresponding SLA-based service constraints, various resource-based parametric monitors are advantageously employed as part of the QoS monitoring system of the present invention. For example, parametric information such as average occupancy of buffer queues, average over- and under-utilization of BW, etc. is deployed in order to manage appropriate aggregate-level QoS metrics. In a presently preferred exemplary embodiment of the present invention, these metrics include throughput, loss, delay, jitter, and available BW.

Throughput is defined as the average amount of data (in bytes and packets) transferred to a destination point per CoS. This measure is utilized to set up, manage, and identify different thresholds on the bulk of traffic flow per CoS. It should be appreciated that by employing per flow, per threshold levels, this measure becomes critically useful for effectuating a proactive action on the traffic behavior. Loss may be defined as the ratio of the amount of data dropped (in bytes and packets) to the amount of data transferred to a destination point per CoS. Accordingly, this metric measures the behavior of the buffer queues allocated to a particular traffic flow against their current reservation (i.e., queue utilization). Further, this metric also identifies to some extent the dynamic behavior of the queues and assists in performing reactive actions on the traffic behavior.

Delay is measured as the queuing delay in the system for different types of behavior. In addition to instantaneous values, the average behavior of this parameter is also important which depends on the CoS type. The average buffer queue depth is computed as the average of the instantaneous depths of the queue taken over a period of time. Jitter is defined as the variation or variance of the queuing delay. Average queue occupancies may be measured in relation to jitter monitoring in order to arrive at better measurements for the resource behavior. Available BW is the unreserved BW, which is monitored per link for traffic engineering purposes.

In order to monitor these QoS parametrics, the present invention provides structures and techniques for measuring the traffic characteristics on the ingress side as well as the egress side of the network element. A policing structure 504 is provided in the ingress TLK 202A which accepts a plurality of flows 502 (having different types) in order to measure the incoming traffic against the expected behavior. Traffic entering the DiffServ domain, wherein the network elements are provided in accordance with the teachings of the present invention, needs to be classified for appropriate treatment inside the domain. It must either be pre-marked by the customer or marked at the edge router level on the service provider's side of the network demarcation point.

Figure 9:
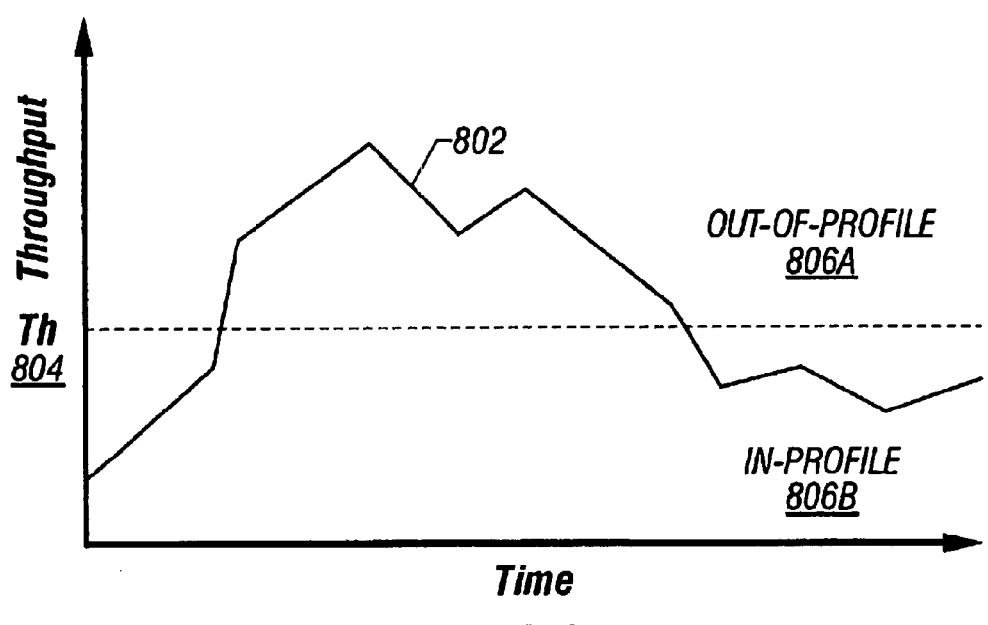
FIG. 9 depicts a policing mechanism for throughput at an ingress TLK of the exemplary network element.

Classification of customer traffic by the service provider's edge router can be based on multiple criteria, ranging from the interworking of various priority schemes to application level analysis of traffic within the IP packets as set forth hereinabove. Traffic policing may be implemented using a classifier (for classifying the incoming traffic), a token bucket or similar mechanism (for monitoring entry traffic levels at each class), and markers (for identifying or downgrading non-compliant traffic). FIG. 9 depicts a policing mechanism for throughput at an ingress TLK of the exemplary network element. As shown in FIG. 9, throughput monitoring is effectuated by tracking the in-profile and out-of-profile measurements over a time period. Throughput measurements are plotted against time as a profile 802 and a threshold 804 is defined for separating the in-profile portion 806B from the out-of-profile portion 806A. It should be appreciated that such aggregate-level throughput measurements suffice because of the incoming traffic flows at wire-speed.

The policing function is preferably effectuated by the NP module at both HW and code levels. A plurality of policing filters are provided as part of the policing structure 504, wherein one or more policing actions per packet are available. Further, policing may also be performed in accordance with a three-color marker (TCM) (described hereinbelow in reference to FIG. 7). Additionally, the loss parameter is measured as a projection of the traffic profile from the previous nodes that generate the incoming traffic towards the network element.

Continuing to refer to FIG. 6, a buffer acceptance and flow control module (hereinafter, a flow controller) is provided on both ingress and egress TLK cards. For example, flow controller 507 is provided as part of the functionality of the NP module (which may be referred to as the UP ramp NP module) of the ingress TLK 202A. Similarly, flow controller 510 is provided as part of the NP module (the DOWN or DN ramp NP module) of the egress TLK 202B. A QoS-aware traffic shaper/scheduler 508 is operable in association with the flow controller 510 on the egress TLK 202B for appropriately loading the outgoing links in accordance with QoS-based policies and constraints.

To monitor the characteristics of the traffic on the ingress and egress sides, various counters are implemented in association with the QoS-aware modules described hereinabove. Counters 506 are provided for the ingress TLK that measure (i) packets and bytes transferred per egress TLK per queue type and (ii) packets and bytes dropped per egress TLK per queue type. In similar fashion, counters 512 are provided for the egress TLK for measuring (i) packets and bytes transmitted in the egress TLK per neighbor per queue (accounts for the throughput); (ii) packets and bytes dropped in the egress TLK per neighbor per queue (accounts for random drops and tail drops); (iii) average queue depth (to account for the delay and jitter parameters); and (iv) number of times a threshold is crossed on a packet discard probability profile.

Figure 7:
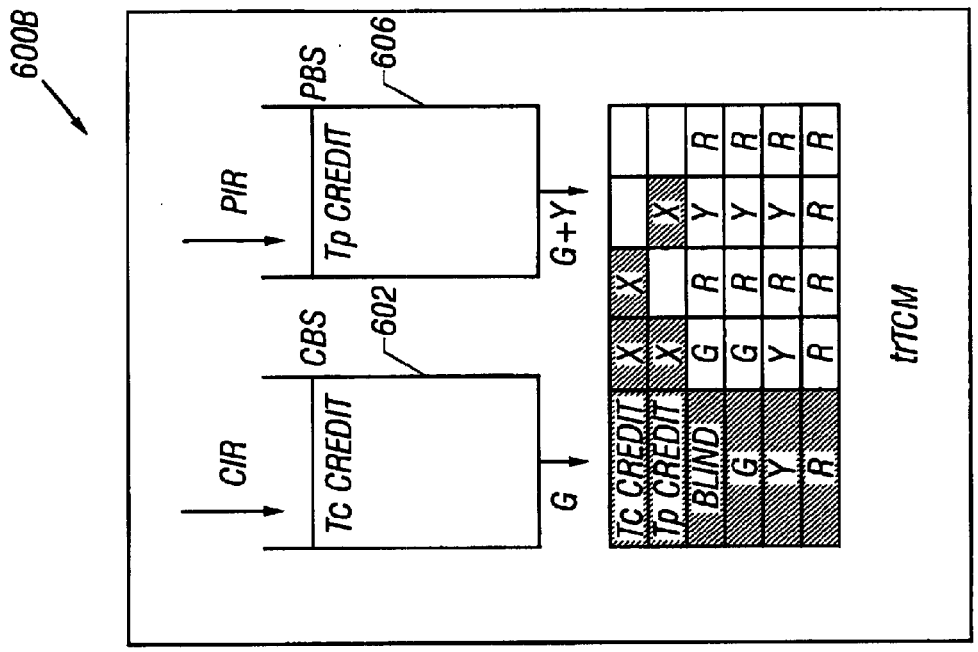
FIG. 7 depicts exemplary color monitors used as a component in a DiffServ traffic conditioner provided in the exemplary network element in accordance with the teachings of the present invention.
Figure 7:
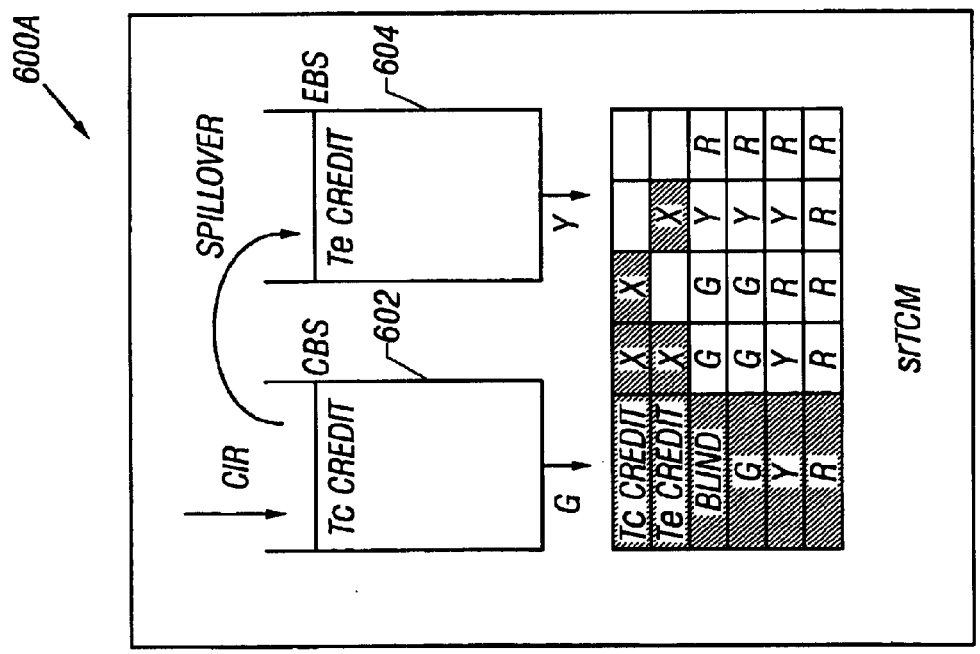

FIG. 7 depicts exemplary color monitors used as a component in a DiffServ traffic conditioner for the policing functionality provided in the exemplary network element in accordance with the teachings of the present invention. Reference numeral 600A refers to a single-rate (sr) TCM and reference numeral 600B refers to a two-rate (tr) TCM. The srTCM 600A meters an IP packet stream and marks (re-marks) its packets either green (G), yellow (Y), or red (R). Marking is based on a Committed Information Rate (CIR) and two associated burst sizes, a Committed Burst Size (CBS) and an Excess Burst Size (EBS). A packet is marked green if it doesn't exceed CBS, yellow if exceeds the CBS, but not the EBS, and red otherwise. Thus, the srTCM is implemented as a dual leaky bucket metering device (bucket 602 and bucket 604) in conjunction with a marker/re-marker for marking the incoming packets depending on their conformance to specified traffic profiles.

The trTCM 600B meters an IP packet stream and marks/re-marks its packets based on two rates, Peak Information Rate (PIR) and CIR. A packet is marked red if it exceeds the PIR value. Otherwise, it is marked either yellow or green depending on whether it exceeds or doesn't exceed the CIR value.

The srTCM is useful for ingress policing of a service where only the length, not the peak rate, of the burst determines service eligibility. On the other hand, trTCM is useful, for example, for ingress policing of a service where a peak rate needs to be enforced separately from a committed rate. Either TCM is operable in one of two modes. In color-blind mode, the meter assumes that the packet stream is uncolored. In the color-aware mode, the meter assumes that some preceding entity has pre-colored the incoming packet stream so that each packet is either green, yellow, or red.

Additional details regarding the TCMs may be found in the Internet Engineering Task Force's RFC 2697 and RFC 2698 which are incorporated by reference herein.

The TCMs 600A and 600B can be used to mark a packet stream in a service, where decreasing levels of assurances (either absolute or relative) are given to packets depending on their color. For example, a service may discard all red packets, because they exceeded both CIR and CBS, forward yellow packets as best effort, and forward green packets with a low drop probability (e.g., AF traffic).

The functionality of the policing structure 504 (depicted in FIG. 6) is at least partly based on a suitable TCM algorithm wherein the TCM-resultant color is interpreted locally by the software in order to effectuate different policing actions, for example: (i) no action; (ii) discard immediately; (iii) rewrite the DS field (i.e., re-mark); or (iv) rewrite the traffic type field (used for defining the drop probability of the packet locally inside the network element).

Figure 8A:
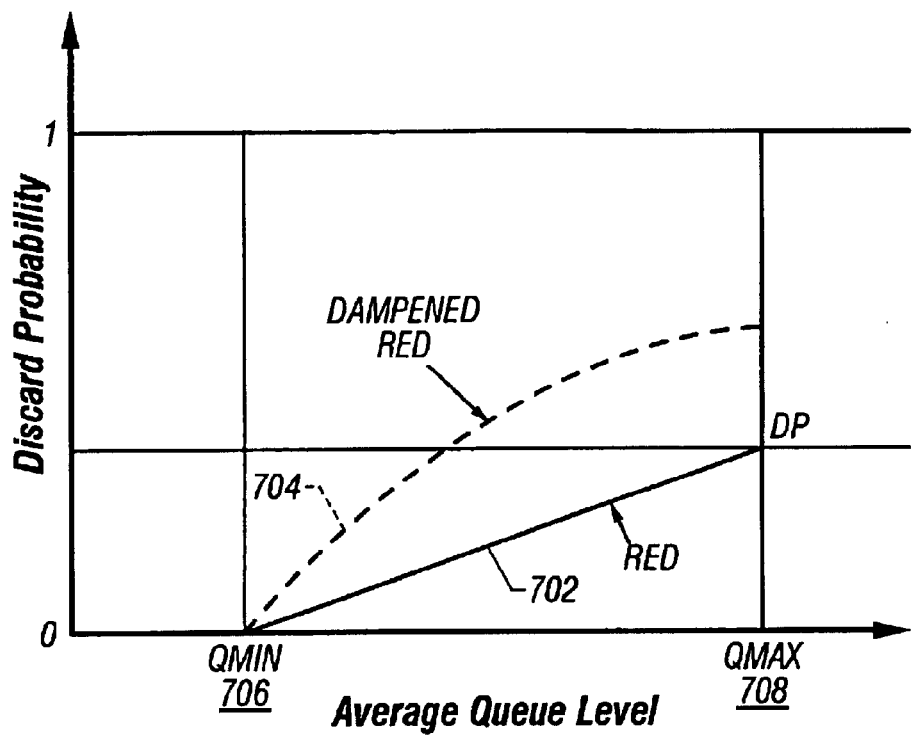
FIGS. 8A–8C depict various packet discarding mechanisms that may be utilized as a component in flow control for controlling traffic flows within the exemplary network element.
Figure 8B:
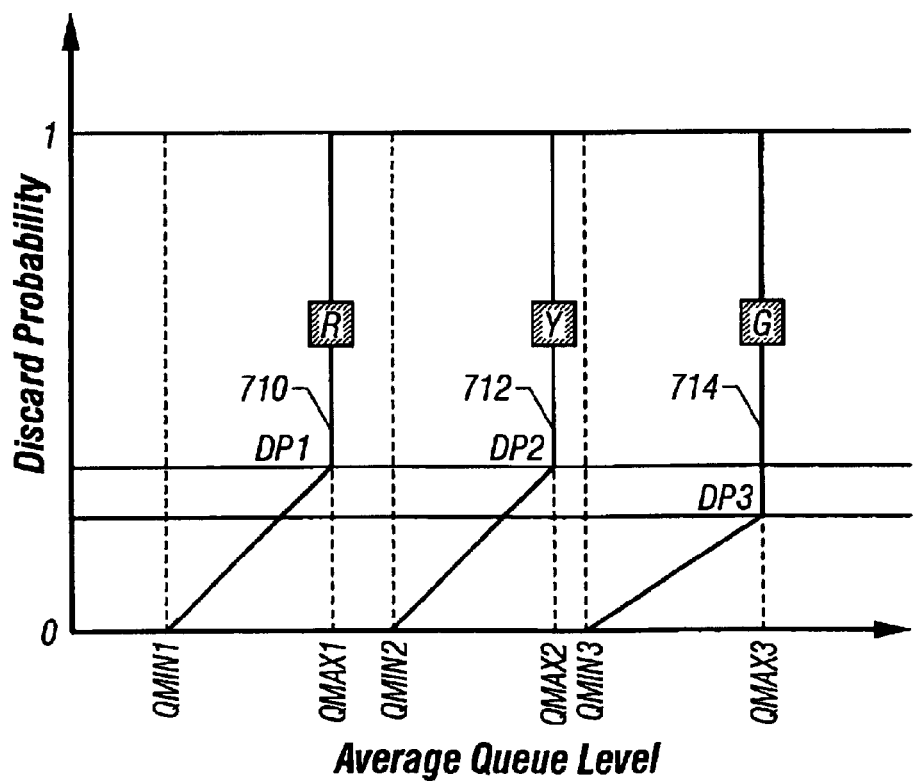
Figure 8C:
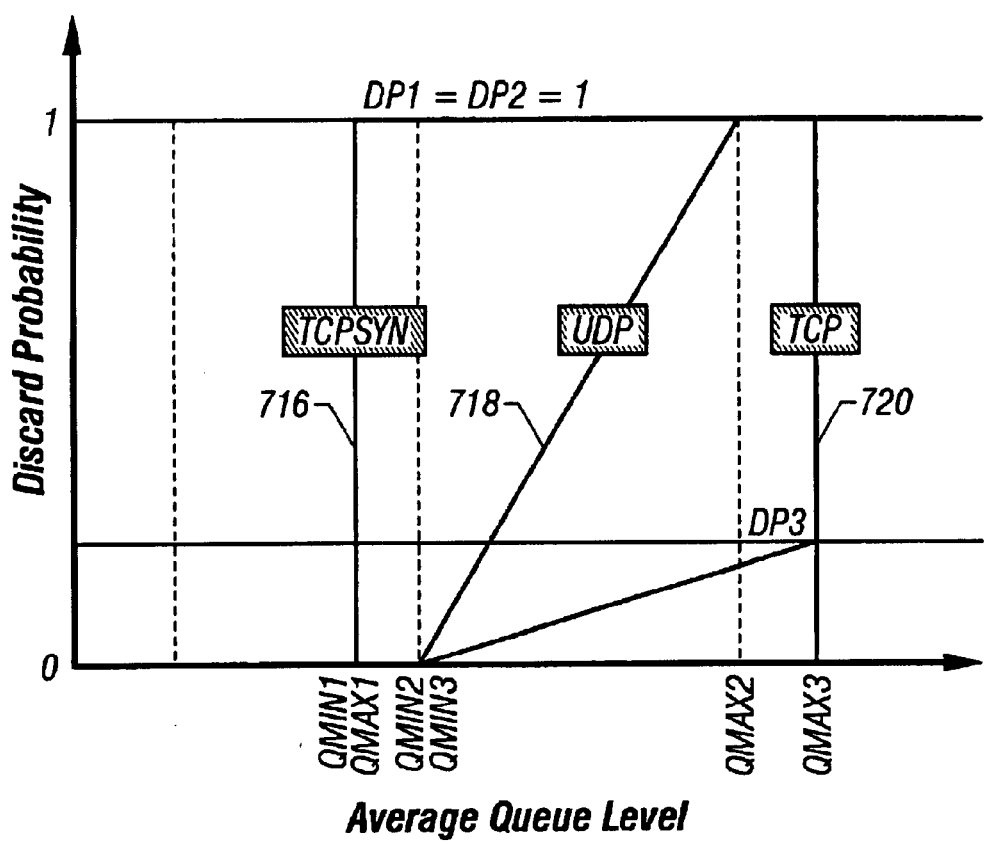

FIGS. 8A–8C depict various packet discarding mechanisms that may be utilized as a congestion avoidance component in flow control for controlling the traffic flows within the exemplary network element of the present invention. Reference numeral 702 in FIG. 8A refers to a conventional random early discard (RED) profile that is based on TCP's congestion control mechanism. By randomly discarding packets prior to high congestion (preferably within certain boundaries of the average queue level, Qmin 706 and Qmax 708), the RED mechanism instructs a TCP source to decrease its transmission rate. In an exemplary embodiment, the RED mechanism is preferably implemented using an exponentially weighted average of a queue level, a discard probability curve (e.g., probability profile 702), and a buffer deep enough to absorb short-term bursts.

Reference numeral 704 refers to a dampened RED profile which critically dampens the buffer dynamical system, thereby avoiding oscillatory behavior of the queue level. Another modified RED mechanism involves applying different RED probabilities on a per-flow threshold basis. For example, depending on whether the packets belong to a flow that is over- or under-shared, different probabilities may be applied. This variant is particularly useful (in conjunction with a QoS aware scheduler) to protect in-profile flows from drops due to RED (i.e., discard probability (DP)=0 if flow queue level<TH, threshold).

FIGS. 8B and 8C depict packet discard mechanisms wherein packet-type awareness is employed. In a Weighted RED (WRED) mechanism, different RED drop probabilities apply, depending on the type of the received packets (e.g., QoS class, AF drop precedence, responsiveness, et cetera). Reference numerals 710, 712 and 714 in FIG. 8B refer to the DP profiles for red, yellow and green packets, respectively. Reference numerals 716, 718 and 720 in FIG. 8C refer to the DP profiles for packets in TCP_SYN, User Datagram Protocol (UDP), and TCP flows, respectively.

In addition to the TCMs and discard mechanisms set forth above, BW provisioning mechanisms are provided as part of the overall QoS monitoring scheme of the present invention. A Reserved/Unreserved (R/U) scheduler is included which can be programmed to provide a mix of reserved and unreserved BW in the network element. Each flow gets a granted BW (GBW) plus a share of the excess BW in proportion to an administrative weight (AW), wherein excess BW is computed as any BW instantaneously unused (which equals [non-reserved BW]+[reserved, but currently unused GBW]+[currently unused AW]).

Further, MPSR internal flow control is utilized for distributing through-switch BW among contenders. A Connection Admission Control (CAC) module and Internal Dynamic Rate-based Flow Control (IDRFC) module are provided as part of the internal flow control that operates at the granularity of VIEPs. The CAC module distributes reserved BW pipes per VIEP based on periodic negotiation among all contending VIEPs. The IDRFC module is responsible for allocating non-reserved BW, which is distributed fairly among contending VIEPs in accordance with a Need For Bandwidth (NFB) resolution mechanism (which is preferably based on the UP ramp's per-VIEP buffer occupancy/arrival rate statistics).

As part of the policing functionality of the QoS monitoring system, the incoming traffic flows are classified, differentiated, and then broadly categorized into RT and RT queues. Depending on classes, traffic differentiators, etc., resource provisioning (e.g., buffers, BW and the like) for the RT and NRT traffic is done in accordance with QoS-based policies and constraints. For example, in setting up an RT flow which is preferably modeled in the "PIPE" model (where entry point and exit point of customer traffic is known), the following actions are taken: (i) GBW is reserved for a particular target port on the egress TLK card; (ii) CAC module associated with the egress TLK reserves this GBW for the VIEP associated with the RT flow; (iii) CAC module associated with the ingress TLK reserves appropriate GBW for the corresponding VIEP; and (iv) the policer parameters per target are updated in the ingress side. The NRT traffic is provisioned both in the PIPE model as well as the "HOSE" model (entry point is known but the exit point may be indeterminate). For setting up the NRT flows, the egress side NP module is first configured with GBW, AW, CBS, and PIR parameters. Optionally, per-class thresholds may then be configured therefor. Also, both ingress side and egress side CAC modules may be configured to reserve appropriate GBW for the VIEP associated with the NRT flow.

The QoS monitoring module of the present invention is operable to measure the behavior of the traffic due to the various reservations in the switch fabric per VIEP between the ingress and egress forwarding engines. Thus, the functionality of the buffer acceptance/flow controller module on the ingress side involves managing the queue behavior dynamics in the context of the egress scheduling, incoming traffic flows, and BW consumption in the switch fabric. The monitoring for the PIPE traffic reflects the conformance of the service provider to their customers, whereas the monitoring for the HOSE traffic reflects the level of over- or under-provisioning for a given COS.

Figure 10:
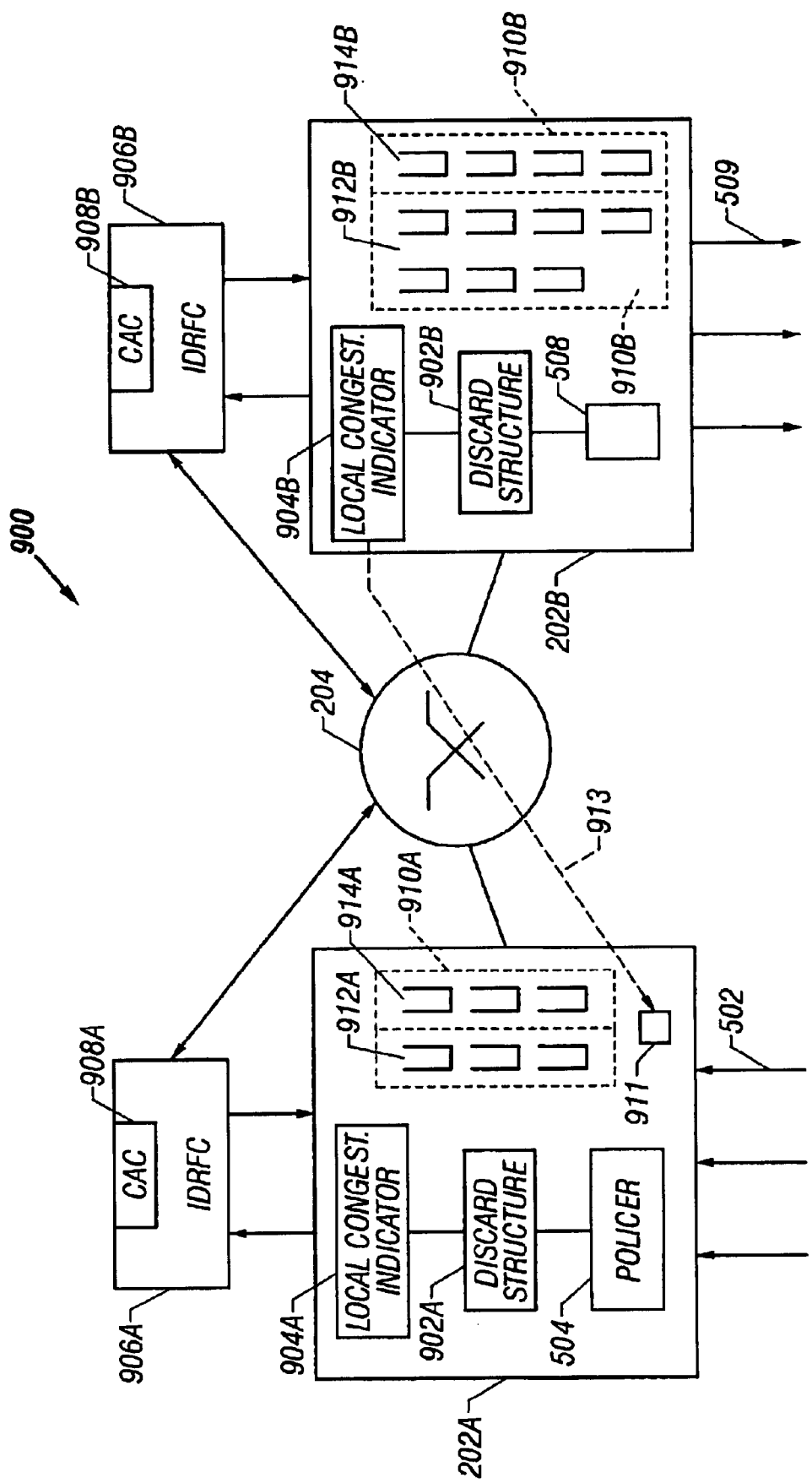
FIG. 10 depicts a functional block diagram of a flow control system for use in the exemplary network element in accordance with the teachings of the present invention.

Referring now to FIG. 10, depicted therein is a functional block diagram of a flow controller system 900 for use in the exemplary network element in accordance with the teachings of the present invention. Ingress TLK card 202A and egress TLK card 202B are exemplified once again as the ingress and egress sides of the network element. Each side is provided with CAC (which is configurable via appropriate signaling messages from the neighboring nodes) and IDRFC modules for BW reservation, VIEP arbitration, and internal flow control. In the exemplary embodiment depicted in FIG. 10, IDRFC 906A and CAC 908A are associated with the ingress side TLK and, in similar fashion, IDRFC 906B and CAC 908B are associated with the egress side TLK.

As described in detail hereinabove, policer 504 of the ingress side TLK is operable in conjunction with a packet discard structure 902A in order to condition the incoming traffic 502 for classification, differentiation, and categorization. A local congestion indicator 904A is provided to be operable in conjunction with the policer and packet discard mechanisms. Multiple flows targeted to the egress side TLKs are set up as a plurality of queues 910A, both RT (reference numeral 912A) and NRT (reference numeral 914A), wherein data buffers are allocated to each queue based on a flow control algorithm. It should be appreciated that the plurality of queues on the ingress TLK are indexed in terms of per egress card and per flow type (e.g., RT vs NRT).

Similarly, a plurality of queues 910B are set up on the egress side TLK for the outgoing traffic 509 emanating from the network element. Preferably, at least eight queues per neighbor are set up in a presently preferred exemplary embodiment of the present invention. These queues are indexed in accordance to per target port, per CoS, and per flow type. Thus, reference numerals 912B and 914 refer to RT and NRT queues for the egress TLK 202B. A local congestion indicator 904B is provided to be operable in conjunction with the egress side discard structure 902B, which in turn is associated with traffic shaper and scheduler 508.

Two factors are predominant in the measurement of the traffic behavior on the ingress side due to flow control, namely, (i) the flow control between the TLKs and (ii) the queuing for the RT and NRT queues between the TLKs. A data buffer to a particular egress TLK is accepted if the egress TLK is not congested. This information is received as a feedback flow control signal 913 from the egress congestion indicator 904B to a target threshold comparator 911 disposed in the ingress TLK 202A. It should be appreciated that where the number of buffers in these queues is sufficiently low, the delay and jitter parameters may be neglected in some implementations. However, under these low buffer numbers, the measurement of throughput and loss parameters becomes more significant. As the QoS module is operable to allocate resources through the switch for RT and NRT queues, throughput measurements can be advantageously used to determine whether the allocation for these two types of traffic is sufficient, both in qualitative and quantitative terms. Where there is an interaction between the RT and NRT sources, such interactions may be due to the condition that switch resource allocation cannot determined because the traffic cannot be characterized (e.g., incapable of identifying high priority routing traffic) or the traffic characteristics cannot be determined a priori (traffic modeled on the HOSE model and where there is no signaling involved).

The loss parameter provides the amount of packet loss in the switch due to under allocation of resources per queue, per egress TLK. Average queue depth measurements represent the delay characteristics between the TLKs. As alluded to in the foregoing, where the number of buffers is very limited, the delay and jitter measurements may be ignored.

Figure 11:
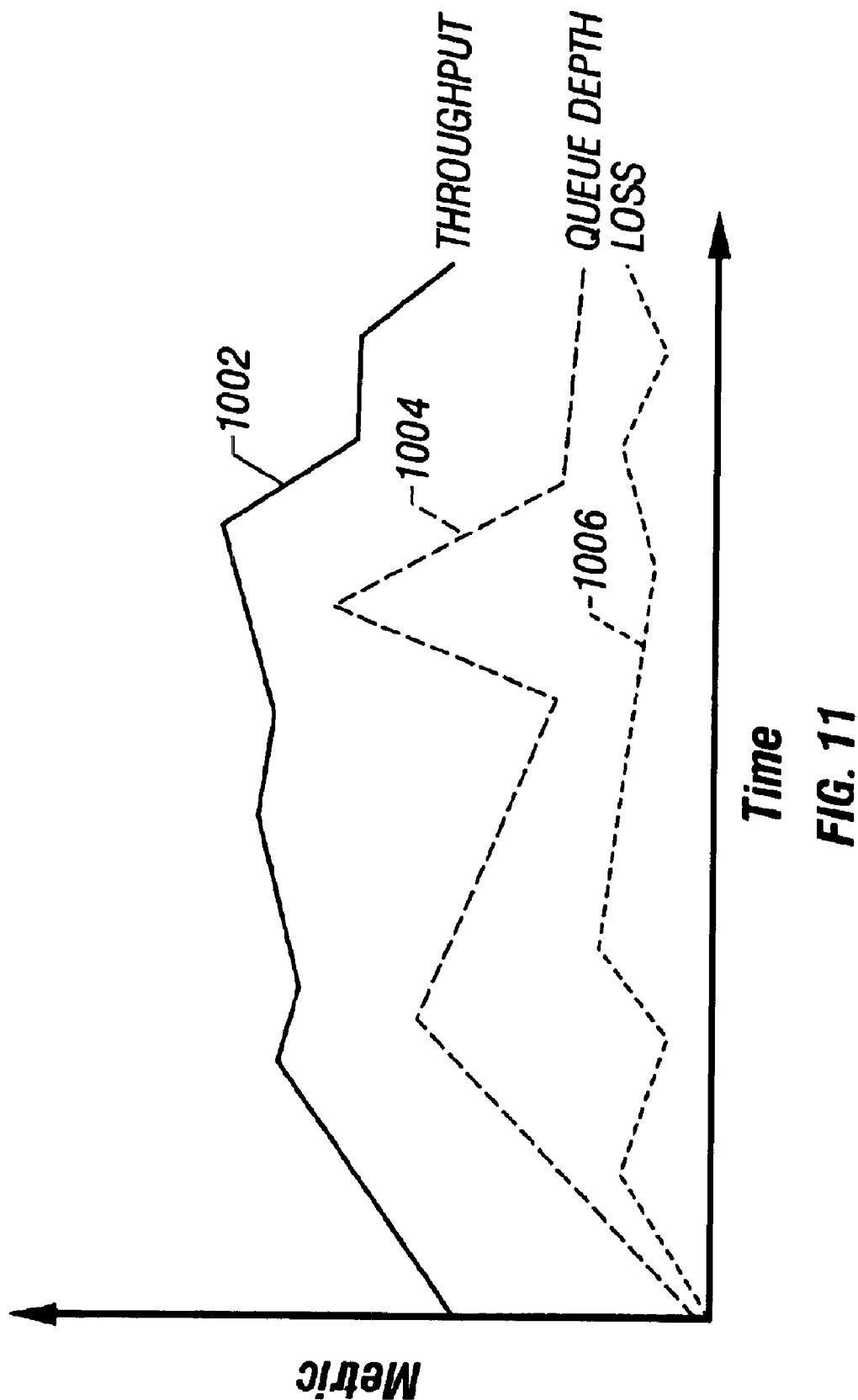
FIG. 11 depicts exemplary metric profiles monitored at an egress TLK of the DiffServ-capable network element of the present invention.

The QoS monitoring module of the present invention is also operable to measure the outgoing traffic behavior for better resource management. The shaper and scheduler 508 is thus provided to be QoS-aware and the discard structure 902B operable with the egress TLK flow controller is preferably provided to be a highly enhanced RED type mechanism with class, color and connection type awareness. FIG. 11 depicts exemplary metric profiles that can be monitored at an egress TLK of the DiffServ-capable network element of the present invention. Throughput 1002, queue depth 1004 and loss 1006 are profiled for the queue behavior on egress side. Egress side buffer acceptance constitutes a mechanism to accept or drop packets and if packets are to be dropped, how they have to be dropped (e.g., RED, WRED, or modified RED, etc.). Once a packet is accepted into the queue, it will be scheduled according to the different scheduler configuration parameters. Thus, a queue buildup is quite possible because of the various scheduling parameters.

As the monitoring of flow queue utilization is critical for DiffServ aggregation, the present invention's QoS monitoring module is also operable to monitor whether DiffServ flow queues are over- or under-utilized. In the presently preferred exemplary embodiment of the present invention, this monitoring is done by comparing total reserved BW for a DiffServ flow queue with the actual usage of allocated resources. The actual resource usage by a flow queue is determined from the total number of bytes forwarded over a period of time. For UP ramp monitoring, each flow queue per neighbor is monitored for different UP ramp thresholds. For example, these thresholds may be yellow (85%) and red (90%). Similarly, DN ramp monitoring is accomplished by setting up different DN ramp thresholds (e.g., blue (65%) and white (50%) levls). In addition, both over-utilization and under-utilization traps may be set up for these multiple UP and DN ramp thresholds.

Based on the foregoing, those skilled in the art should appreciate that the present invention provides an innovative IPQoS monitoring solution that advantageously quantifies over- and under-utilized resources and delay measurements for a DiffServ-capable routing element of an autonomous network. By monitoring aggregated QoS parameters such as average occupancy of queues, average utilization levels, etc. and comparing these aggregated parameters against established thresholds, a better resource provisioning model is obtained for effectuating DiffServ capability in a more efficient manner. Further, QoS-relevant parametric information obtained from the monitoring system of the present invention is particularly useful for building and analyzing end-to-end SLAs.

It is believed that the operation and construction of the present invention will be apparent from the foregoing Detailed Description. While the system and method shown and described have been characterized as being preferred, it should be readily understood that various changes, modifications and enhancements could be made therein without departing from the scope of the present invention as set forth in the following claims.

What is claimed is:

1. A method for processing Quality of Service (QoS) parametric information in a network element operable in an Internet Protocol (IP) network, wherein said network element includes at least one terminating line card operable as an ingress card supporting an incoming communications link, at least one terminating line card operable as an egress card supporting an outgoing communications link and a switch fabric disposed between said ingress and egress cards for supporting a plurality of virtual ingress/egress pipes (VIEPs) therebetween, comprising the steps of:
  receiving incoming information on said incoming link of said network element;
  determining in an ingress portion of a network processor system disposed on said ingress card whether said incoming information pertains to an IP-based service;
  responsive to said determining step, propagating said incoming information to an egress portion of said network processor system via said switch fabric, said egress portion including an embedded processor operable to perform a plurality of IP-based QoS (IPQoS) monitoring operations and for processing said incoming information into processed information; and
  transmitting said processed information to said egress card via a select VIEP for routing said processed information on said outgoing link to a neighbor in said network.

2. The method for processing QoS parametric information in a network element operable in an IP network as set forth in claim 1, wherein said IPQoS monitoring operations include policing said incoming information at said ingress card.

3. The method for processing QoS parametric information in a network element operable in an IP network as set forth in claim 2, wherein said policing step comprises measuring said incoming information against an expected behavior profile associated therewith.

4. The method for processing QoS parametric information in a network element operable in an IP network as set forth in claim 1, wherein said IPQoS monitoring operations include a plurality of flow control steps for effectuating bandwidth management for said switch fabric.

* * * * *